United States Patent
Chen et al.

(10) Patent No.: US 11,300,470 B2
(45) Date of Patent: Apr. 12, 2022

(54) FLEXIBLE TEMPERATURE-SENSITIVE PRESSURE SENSOR BASED ON NANOPARTICLE LATTICE ARRAY QUANTUM CONDUCTANCE, AND ASSEMBLY METHOD AND APPLICATION THEREOF

(71) Applicant: Nanjing University, Jiangsu (CN)

(72) Inventors: Minrui Chen, Jiangsu (CN); Min Han, Jiangsu (CN); Chang Liu, Jiangsu (CN); Weifeng Luo, Jiangsu (CN); Chen Jin, Jiangsu (CN)

(73) Assignee: Nanjing University

( * ) Notice: Subject to any disclaimer, the term of this patent is extended or adjusted under 35 U.S.C. 154(b) by 336 days.

(21) Appl. No.: 16/745,512

(22) Filed: Jan. 17, 2020

(65) Prior Publication Data
US 2020/0232866 A1 Jul. 23, 2020

(30) Foreign Application Priority Data
Jan. 23, 2019 (CN) .......................... 201910063879.7

(51) Int. Cl.
*G01L 25/00* (2006.01)
*G01L 1/22* (2006.01)
(Continued)

(52) U.S. Cl.
CPC ............... *G01L 25/00* (2013.01); *G01K 7/16* (2013.01); *G01K 13/00* (2013.01); *G01K 15/005* (2013.01); *G01L 1/2287* (2013.01); *G01L 5/00* (2013.01)

(58) Field of Classification Search
CPC ......... G01L 25/00; G01L 1/2287; G01L 5/00; G01K 7/16; G01K 13/00
(Continued)

(56) References Cited

U.S. PATENT DOCUMENTS 5,989,700 A * 11/1999 Krivopal ................ G01L 1/20
524/495
9,538,924 B1 * 1/2017 Asiri ...................... G01L 1/20
(Continued)

FOREIGN PATENT DOCUMENTS

CN 105444872 A 3/2016

OTHER PUBLICATIONS

Zheng M, Li W, Xu M, Xu N, Chen P, Han M, Xie B. Strain sensors based on chromium nanoparticle arrays. Nanoscale. accepted Aug. 31, 2013,6(8):3930-3.

*Primary Examiner* — Nathaniel T Woodward
(74) *Attorney, Agent, or Firm* — Lerner, David, Littenberg, Krumholz & Mentlik, LLP (57) ABSTRACT

The present invention discloses a flexible temperature-sensitive pressure sensor based on nanoparticle array quantum conductance, and an assembly method and application thereof. The sensor includes a high polymer film, metal nanoparticle arrays, metal microelectrodes, and an external circuit for conductance measurement; at least one group of metal nanoparticle arrays are deposited on upper and lower surfaces of the high polymer film, and in the same group, positions of metal nanoparticle arrays on the upper and lower surfaces are in one-to-one correspondence; the metal microelectrodes are arranged on two sides of each group of metal nanoparticle arrays and are symmetrically distributed on the upper and lower surfaces of the high polymer film; and the external circuit for conductance measurement is electrically connected to the metal microelectrodes. Conductance response signals of the nanoparticle arrays in the present invention have an exponential relationship with a distance between particles.

20 Claims, 3 Drawing Sheets

(51) Int. Cl.
  *G01L 5/00*     (2006.01)
  *G01K 15/00*    (2006.01)
  *G01K 13/00*    (2021.01)
  *G01K 7/16*     (2006.01)

(58) Field of Classification Search
  USPC .......................................................... 73/1.15
  See application file for complete search history.

(56) References Cited

U.S. PATENT DOCUMENTS

| | | | |
|---|---|---|---|
| 10,704,965 B2* | 7/2020 | Haick | G01L 1/16 |
| 2010/0050788 A1* | 3/2010 | Shim | G01L 1/044 |
| | | | 702/41 |
| 2012/0313860 A1* | 12/2012 | Hashimura | G01L 1/20 |
| | | | 977/773 |
| 2015/0082920 A1* | 3/2015 | Haick | B82Y 15/00 |
| | | | 73/865.8 |
| 2015/0177079 A1* | 6/2015 | Eichhorn | G01L 9/0054 |
| | | | 977/956 |
| 2016/0258829 A1* | 9/2016 | Celik-Butler | G01L 5/226 |
| 2016/0299613 A1* | 10/2016 | Alonso | G06F 3/0412 |
| 2017/0363489 A1* | 12/2017 | Haick | G01L 5/226 |
| 2019/0231267 A1* | 8/2019 | Oren | B32B 9/045 |
| 2019/0339143 A1* | 11/2019 | Jarvi | A43B 17/00 |

* cited by examiner

FLEXIBLE TEMPERATURE-SENSITIVE PRESSURE SENSOR BASED ON NANOPARTICLE LATTICE ARRAY QUANTUM CONDUCTANCE, AND ASSEMBLY METHOD AND APPLICATION THEREOF

CROSS REFERENCE TO RELATED APPLICATIONS

This application claims priority from Chinese application number 201910063879.7, filed Jan. 23, 2019, the disclosure of which is hereby incorporated herein by reference.

TECHNICAL FIELD

The present invention pertains to the field of sensors and detection instruments, and relates to a wearable flexible sensor capable of simultaneously measuring external pressure and ambient temperature, where subtle changes in external pressure and temperature are obtained by comparing magnitudes of conductance changes of nanoparticle arrays on upper and lower surfaces of a flexible film. Specifically, the present invention relates to a flexible temperature-sensitive pressure sensor based on nanoparticle array quantum conductance, and assembly method and application thereof.

BACKGROUND

An electronic skin (E-skin) is a latest wearable sensing device having high application value in fields of human behavior detection, life and health monitoring, artificial intelligence, robots, etc. As a substitute for human skin, the electronic skin needs to have the capability to sense touch, temperature, and pain, in addition to physical characteristics such as flexibility and elasticity. Among the senses, the touch and temperature senses are the most basic detection functions of the electronic skin. Therefore, it is of great significance for electronic skin development to integrate a sensor capable of detecting pressure and temperature onto a flexible substrate. Currently, there are mainly piezoelectric, piezocapacitive, and piezoresistive pressure sensors. A piezoelectric pressure sensor senses a change in external pressure based on the basic principle that a piezoelectric material generates a pulsed electrical signal under pressure. On a piezocapacitive sensor, a flexible dielectric is inserted between electrode plates. A deformation of the dielectric varies with different pressures applied on the electrode plates. Therefore, different capacitances on the electrode plates can be determined to measure external pressure. The working principle of a piezoresistive sensor is as follows: An internal band structure of a piezoresistive material changes under pressure, which causes internal resistance of the material to change, and a difference in external pressure is detected based on this. The pressure sensors in these three different working modes have respective disadvantages. The electrical signal generated by the piezoelectric sensor comes only at the moment when the pressure is loaded, and does not maintain its signal magnitude as the pressure is maintained. Therefore, the piezoelectric pressure sensor is greatly restricted in practical application. The piezocapacitive pressure sensor measures capacitance as an electrical parameter, and therefore, complexity of external circuit measurement is much higher than the other two types of sensors. Although external circuit measurement of the piezoresistive pressure sensor is much simpler, its disadvantages such as limited measurement resolution and insufficient sensitivity cannot be ignored. In addition, sensing performance of all these three types of sensors has a certain drift with temperature changes. Therefore, a temperature sensor integrated with the pressure sensor on the electronic skin is intended not only for enhancing the temperature sense of the electronic skin, but also for correcting a temperature drift of the pressure sensor. However, integrating the two sensors has many disadvantages. One disadvantage is that a material of the temperature sensor is usually rigid, which easily destroys the flexibility of the electronic skin. In addition, a signal measured by the sensor is distorted because there is always a difference in position between the independent temperature sensor and the pressure sensor, and a temperature difference caused by the position difference cannot be ignored. To tackle the distortion, sensors are usually paired in one-to-one manner. That is, one temperature sensor corresponds to one pressure sensor to shorten a distance between sensors as much as possible, thereby reducing the adverse effect caused by the difference. However, this method directly increases the quantity of temperature sensors, and causes its measurement costs to rise dramatically. In conclusion, it is urgent for the electronic skin industry to find a functional material that can simultaneously sense temperature and pressure.

In previous research, it has been found that tunneling conductance of an electron in a metal nanoparticle array can easily sense a tiny deformation on the substrate. Accordingly, a strain sensor, a vibration sensor, and a barometer based on nanoparticle array quantum conductance are developed (refer to documents such as Nanoscale, 2014, 6, 3930, and patents such as CN105444872A). Conductance of a nanoparticle array increases after the substrate to which the nanoparticle array is attached is compressed, and decreases after the substrate is stretched. However, parallel measurement of pressure and temperature by preparing dense nanoparticle arrays on both the upper and lower surfaces of a flexible substrate has not been researched.

SUMMARY

Technical problem to be resolved: To overcome disadvantages of the prior art, in the present invention, temperature and pressure are simultaneously sensed by one flexible sensor based on that quantum conductance of two nanoparticle arrays responds differently to temperature and pressure changes. This is an improvement on the prior art in which two independent units, that is, a temperature sensor and a pressure sensor, are integrated on an electronic skin. In the present invention, instead of integrating a temperature sensor with a pressure sensor, two parameters, namely, the pressure change and the temperature change, are extracted from relative conductance changes of the two nanoparticle arrays. In view of this, the present invention provides a flexible temperature-sensitive pressure sensor based on nanoparticle array quantum conductance, and an assembly method and application thereof.

Technical solutions: A flexible temperature-sensitive pressure sensor based on nanoparticle array quantum conductance is disclosed. The sensor includes a high polymer film, metal nanoparticle arrays, metal microelectrodes, and an external circuit for conductance measurement. At least one group of metal nanoparticle arrays is deposited on upper and lower surfaces of the high polymer film. In each group, positions of metal nanoparticle arrays on the upper and lower surfaces are in one-to-one correspondence. The metal microelectrodes are arranged on two sides of each group of metal nanoparticle arrays and are symmetrically distributed on the upper and lower surfaces of the high polymer film. The external circuit for conductance measurement is electrically connected to the metal microelectrodes. When the detected ambient temperature increases or decreases, conductivity of the nanoparticle arrays on the upper and lower surfaces of the sensor increases or decreases with the same magnitude as the temperature changes. However, when pressure is applied on one of the surfaces and the elastic film undergoes bending deformation, the strain-induced curvature of the upper surface is different from that of the lower surface because the thickness of the film cannot be ignored. Therefore, on the upper and lower surfaces of the sensor, the conductance of the nanoparticle arrays changes with different magnitudes or even with opposite tendencies. In conclusion, externally applied pressure and ambient temperature changes can be obtained simultaneously by using the external circuit to measure conductance changes of the two nanoparticle arrays. In addition, the metal nanoparticle arrays may be in a group or be an N*M sensor array (values of N and M are greater than or equal to 1).

Preferably, the high polymer film is an insulating film with a resistivity greater than or equal to $10^9$ Ω·m, an elastic modulus ranging from 100 kPa to 4000 MPa, and a thickness ranging from 0.05 mm to 1 mm, including: polydimethylsiloxane, silicone rubber, fluorine rubber, or polyethylene terephthalate. In addition, the surface of the high polymer film needs to be flat and smooth without obvious defects.

Preferably, the metal nanoparticle arrays are made of a metal with high conductivity such as gold, silver, palladium, platinum, chromium, or aluminum. Metal nanoparticles can be generated by using a gas aggregation method. An average particle size ranges from 5 nm to 30 nm. An average distance between adjacent particles ranges from 0.1 nm to 5 nm. Coverage of the metal nanoparticle arrays ranges from 30% to 90%. Electrons are transmitted between particles in a tunneling or hopping manner. Resistance of each array is greater than or equal to 10 kΩ.

Preferably, the metal microelectrodes are interdigital electrodes, parallel electrodes, or spiral electrodes made of gold or silver. An electrode thickness ranges from 100 nm to 300 nm to ensure its conductivity. A distance between two electrodes ranges from 4 μm to 300 μm. The microelectrodes can be prepared by means of mask printing, electroplating, evaporation, or the like. In addition, it is ensured that the microelectrodes well stick to the surfaces of the high polymer film and have high conductivity, to prevent repeated pressure tests or temperature changes from causing the microelectrodes to break and fell off or the conductivity to decrease.

Preferably, the external circuit for conductance measurement has a collection frequency ranging from 1 Hz to 2000 Hz, and is connected to the metal microelectrodes through enameled wires with a diameter ranging from 10 μm to 100 μm. In addition, the external circuit for conductance measurement can measure the resistance, conductance, or voltage-dividing signals of the arrays, needs to simultaneously collect electrical signals of nanoparticle arrays in the same group, and has the function of inputting parameters to solve at least a binary linear equation.

Preferably, a measurement temperature range of the sensor is 20-70° C.

Preferably, a measurement pressure range of the sensor is 0.5-100,000 Pa.

A method for assembling the flexible temperature-sensitive pressure sensor based on nanoparticle array quantum conductance is disclosed, including the following steps:

step 1: selecting a high polymer film with a smooth and clean surface without obvious scratches;

step 2: printing metal microelectrodes at corresponding positions on upper and lower surfaces of the high polymer film by means of mask printing, electroplating, or evaporation;

step 3: depositing metal nanoparticle arrays with the same coverage between the metal microelectrodes on the upper and lower surfaces of the high polymer film, where metal nanoparticles are generated by a magnetron plasma gas aggregation cluster source, and nanoparticle beams are formed based on a differential pressure and deposited between the metal microelectrodes; and during the deposition, both ends of the electrodes are connected to a monitoring circuit to monitor nanoparticle array conductance in real time;

step 4: after depositing the metal nanoparticle arrays, using enameled wires to connect the metal microelectrodes to an external circuit for conductance measurement;

step 5: placing the high polymer film on a heating platform, operating the heating platform to control the high polymer film in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement to implement temperature calibration of the sensor; and step 6: placing the high polymer film in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement to implement pressure calibration of the sensor.

Use of the flexible temperature-sensitive pressure sensor based on nanoparticle array quantum conductance in wearable device, artificial skin, or micro-robot detection is disclosed.

The operating principle of the flexible temperature-sensitive pressure sensor based on nanoparticle array quantum conductance in the present invention is as follows: Quantum conductance of electrons in the metal nanoparticle arrays is related to both an interplanar distance between nanoparticles and the ambient temperature. If nanoparticle arrays are deposited at corresponding positions on upper and lower surfaces of a piece of flexible material, conductance of the two arrays should increase or decrease together when the temperature changes (usually, a temperature difference between corresponding positions on upper and lower surfaces of a material less than 1 mm in thick can be ignored). When pressure or tensile force is applied on a surface of the material, if the upper surface of the material is compressed, the lower surface is stretched; and if the upper surface is stretched, the lower surface is compressed. Therefore, the relative conductance changes of the nanoparticle arrays on the two surfaces caused by the effect of force are always in opposite directions. In this way, two sensing variables, namely, pressure and temperature, can be parsed based on the conductance changes.

Beneficial effects: (1) Conductivity response signals of the nanoparticle arrays in the present invention have an exponential relationship with the distance between particles. Therefore, the sensor gives an extremely sensitive response to a deformation caused by pressure. (2) Conductance of nanoparticle arrays on upper and lower surfaces of the same sensing unit gives greatly different responses to temperature and pressure changes. Therefore, local pressure and temperature information can be obtained by comparing conductance changes of the two arrays. This avoids integrating an additional temperature sensor, which simplifies the sensing structure. (3) Impedance of the nanoparticle arrays is in the order of megohms, leading to extremely low power consumption. (4) The sensor can be extensively produced and packaged, and can be widely used in fields such as wearable device, artificial skin, and micro-robot detection.

BRIEF DESCRIPTION OF THE DRAWINGS

in the figure, 1. high polymer film, 2. metal nanoparticle arrays, 3. metal microelectrodes, and 4. external circuit for conductance measurement.

DETAILED DESCRIPTION

The following embodiments further illustrate content of the present invention, but should not be construed as a limitation on the present invention. Modifications and substitutions made to the methods, steps, or conditions of the present invention without departing from the spirit and essence of the present invention shall fall within the scope of the present invention. Unless otherwise specified, the technical means used in the embodiments are conventional means well known to a person skilled in the art.

Embodiment 1

In the following description, different effects of pressure on conductance change tendencies of arrays on a sensor are deduced based on a principle of physics.

Figure 1:
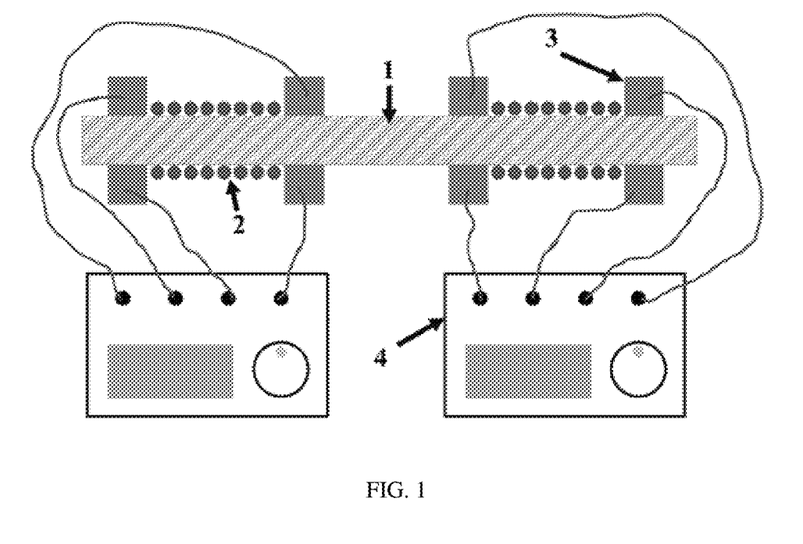
FIG. 1 is a schematic structural diagram of a flexible temperature-sensitive pressure sensor based on nanoparticle array quantum conductance according to the present invention.
Figure 2:
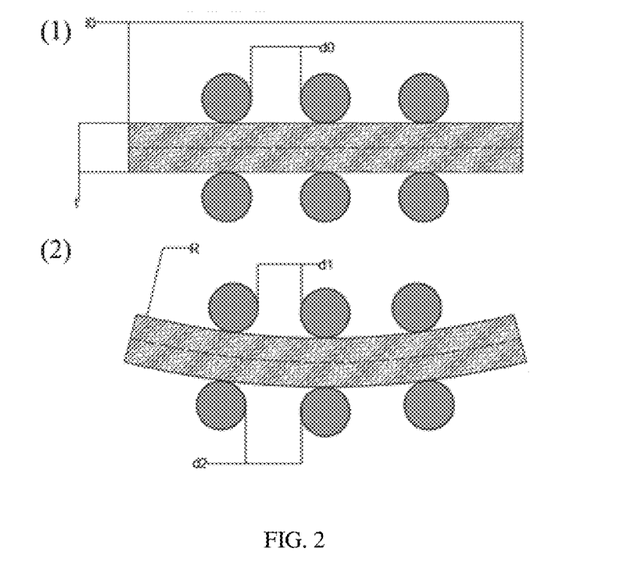
FIG. 2 is a schematic structural diagram of a pressure-induced deformation of a high polymer film, where (1) is an initial state and (2) is a deformed state.

It is assumed that the thickness of a flexible film is t, the length is $l_0$, and the initial average distance between nanoparticles in corresponding arrays on upper and lower surfaces of the film is $d_0$. As shown in (1) in FIG. 2, when pressure is applied on the upper surface of the film, the flexible film undergoes a deformation with a curvature of R, and changes from state (1) to state (2) in FIG. 2. In this case, the average distance between nanoparticles on the upper surface is $d_1$, and the average distance between nanoparticles on the lower surface is $d_2$. Usually, the neutral line of the film does not change during strain occurrence. Therefore, lengths $l_1$ and $l_2$ of the upper and lower surfaces change as follows:

$$l_1 = l_0 - \frac{t}{2R}, \text{ and}$$

$$l_2 = l_0 + \frac{t}{2R}.$$

Accordingly, strains occurring on the upper and lower surfaces are respectively:

$$\varepsilon_1 = \frac{l_1 - l_0}{l_0} = \frac{d_1 - d_0}{d_0} = -\frac{t}{2Rl_0}, \text{ and}$$

$$\varepsilon_2 = \frac{l_2 - l_0}{l_0} = \frac{d_2 - d_0}{d_0} = \frac{t}{2Rl_0}.$$

Since the conductance of the nanoparticle arrays has an exponential relationship with the distance d, it can be simply written as:

$$G \propto \exp(-\beta d)$$

where β indicates a constant related to the arrays. In this case, relative conductance changes of the arrays on the upper and lower surfaces are respectively:

$$\Delta G_1 / G_0 = \frac{G_1 - G_0}{G_0} \propto \exp(-\beta(d_1 - d_0)) - 1 \propto -\beta d_0 \varepsilon_1 = \frac{\beta d_0 t}{2Rl_0},$$

and $$\Delta G_2 / G_0 = \frac{G_2 - G_0}{G_0} \propto \exp(-\beta(d_2 - d_0)) - 1 \propto -\beta d_0 \varepsilon_2 = -\frac{\beta d_0 t}{2Rl_0}.$$

By comparing the upper and lower results, it is easy to find that absolute values of the relative conductance changes on the upper and lower surfaces are equal, but the signs are completely opposite. Therefore, in an ideal case, when pressure is applied on a certain surface of the flexible sensor, conductance change tendencies of the corresponding nanoparticle arrays on the upper and lower surfaces of the flexible sensor should be completely opposite. Considering that the temperature causes exactly the same conductance change for the arrays on the upper and lower surfaces of the flexible film, the flexible sensor can be used to detect and separate temperature and pressure signals with reference to two different change tendencies in responses given by the upper and lower arrays to temperature and pressure.

Embodiment 2

A method for preparing the flexible temperature-sensitive pressure sensor based on nanoparticle array quantum conductance is disclosed, including the following steps:

Step 1: select a high polymer insulating film with a smooth and clean surface without obvious scratches. The film used is polyethylene terephthalate, and the selected film is 0.1 mm in thick.

Step 2: print metal conductive microelectrodes with overlapping patterns at corresponding positions on upper and lower surfaces of the high polymer film. The microelectrodes here are interdigitated silver electrodes that are vapor-deposited by a mask in a vacuum. The thickness of the metal layer is 100 nm, and the width of a gap between positive and negative electrodes is 100 μm.

Step 3: deposit metal nanoparticle arrays with the same coverage between the interdigitated electrodes. Metal nanoparticles were prepared by using a magnetron plasma gas aggregation method, and nanoparticle beams were formed based on a differential pressure and deposited between the interdigitated electrodes. Both ends of the electrodes were connected to a monitoring circuit to monitor nanoparticle array conductance in real time. Palladium was selected as the metal material. Sizes of the nanoparticles were controlled between 8 nm and 12 nm. The coverage was 42%, and the conductance was 500 nS.

Step 4: after depositing the nanoparticle arrays, use enameled wires to connect an external circuit to the measurement electrodes.

Figure 3:
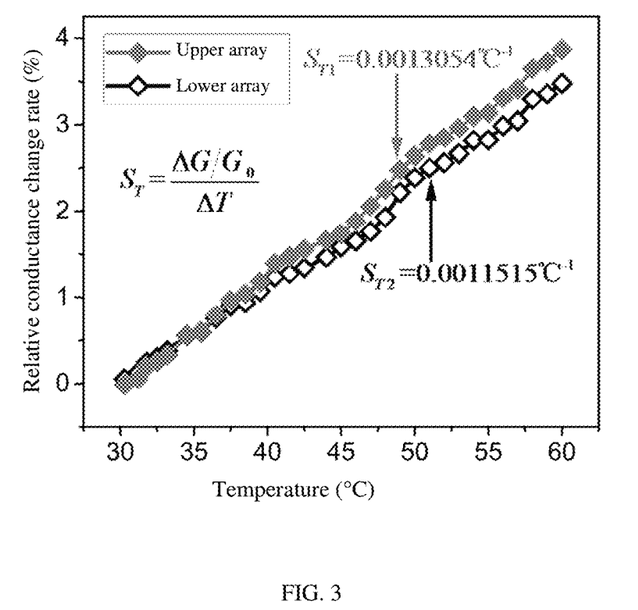
FIG. 3 is a line graph of temperature calibration of the sensor according to the present invention.

Step 5: place the high polymer film of the prepared sensor evenly on a glass slide, and then place the slide on a heating platform without applying any pressure on the film; bring a K-type thermocouple into contact with the high polymer film to measure the temperature on the film in real time; control the heating platform to slowly raise the temperature, so that the sensor is at different ambient temperatures (30-60° C.); and read the temperature displayed by the thermocouple, and record the real-time conductance of the upper and lower arrays on the film, as shown in FIG. 3. It can be found that temperature sensitivity coefficients of the upper and lower arrays are respectively $S_{T1}=0.0013054°$ $C.^{-1}$ and $S_{T2}=0.0011515° C.^{-1}$.

Figure 4:
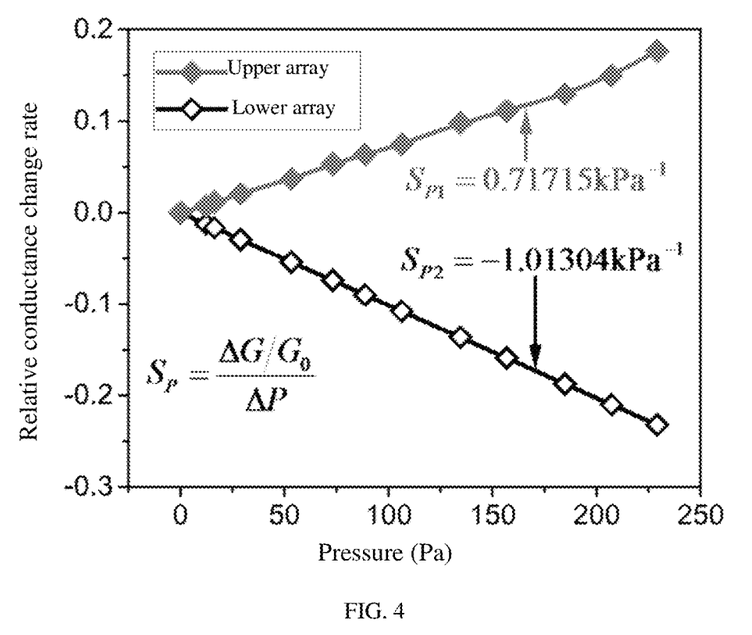
FIG. 4 is a line graph of pressure calibration of the sensor according to the present invention.

Step 6: place the high polymer film of the prepared sensor evenly on a thin sponge, keep the ambient temperature of the sensor unchanged, add different weights onto the film to provide different pressures applied on the upper surface of the film, and use the external circuit to record conductance changes of the upper and lower arrays under different pressures, as shown in FIG. 4. It can be found that pressure sensitivity coefficients of the upper and lower arrays are respectively $S_{P1}=0.71715$ kPa$^{-1}$ and $S_{P2}=1.01304$ kPa$^{-1}$.

Step 7: obtain the following sensitivity matrix of the temperature-sensitive pressure sensor with reference to steps 5 and 6:

$$S = \begin{pmatrix} S_{T1} & S_{P1} \\ S_{T2} & S_{P2} \end{pmatrix} = \begin{pmatrix} 0.0013054 & 0.71715 \\ 0.0011515 & -1.01304 \end{pmatrix}.$$

Figure 5:
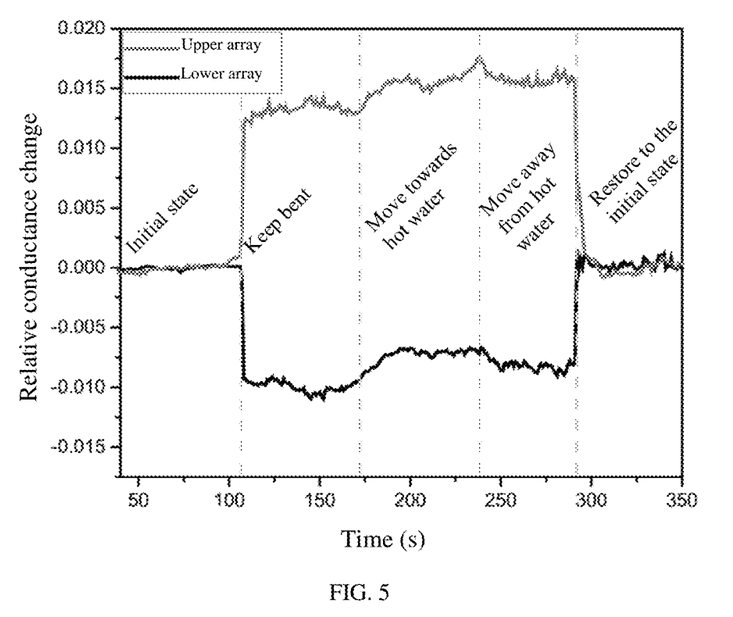
FIG. 5 is a line graph of real-time temperature and pressure responses of the sensor according to the present invention.

To test the ultra-sensitive flexible temperature-sensitive pressure sensor simultaneously responding to temperature and pressure changes, the prepared sensor is attached on the back of the second joint of a tester's left middle finger at room temperature of 30° C., and conductance changes of the upper and lower arrays are measured in real time during pressure applying and temperature changing. The tester completes a series of actions in a required sequence: initially, straighten the finger and keep the action for a period of time; bend the finger and keep the action for a period of time; keep the bending action, and move the finger towards a cup of hot water and keep the action for a period of time; keep the bending action, and move the finger far away from the hot water and keep the action for a period of time; and straighten the finger and keep the action for a period of time. FIG. 5 shows the conductance changes of the upper and lower arrays during the series of actions. Sample conductance when the close-to-hot-water state is switched to the far-away-from-hot-water state is selected, and the obtained conductance changes are respectively $\Delta G_1=0.01769$ and $\Delta G_2=0.00719$. A conductance change relationship written based on the sensitivity coefficient matrix is:

$$\begin{pmatrix} S_{T1} & S_{P1} \\ S_{T2} & S_{P2} \end{pmatrix} \begin{pmatrix} \Delta T \\ \Delta P \end{pmatrix} = \begin{pmatrix} \Delta G_1 \\ \Delta G_2 \end{pmatrix}.$$

By solving the system of binary linear equations, it can be obtained that the pressure applied on the sensor is 15 Pa, and the surface temperature rises by 5.94° C., which is about 36° C.

Figure 6:
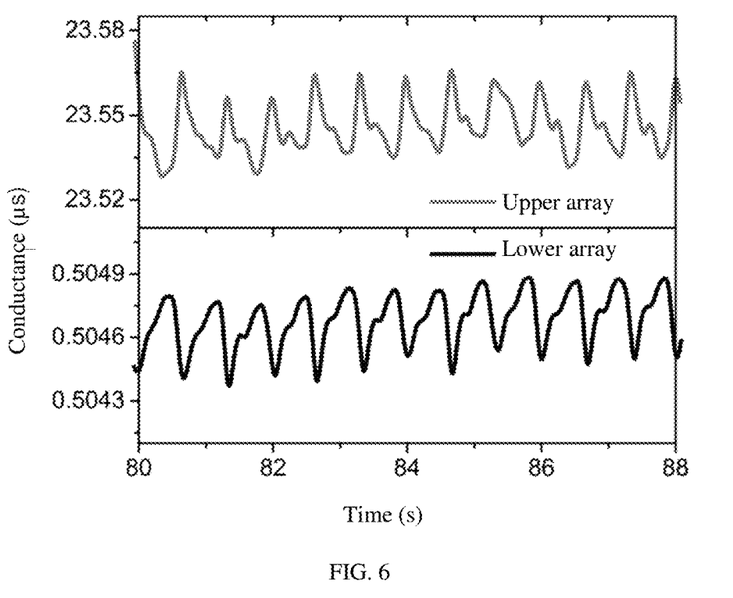
FIG. 6 is a line graph of real-time conductance changes of the sensor according to the present invention during pulse measurement.

To test wearability of the ultra-sensitive flexible temperature-sensitive pressure sensor, the prepared sensor is attached to the tester's wrist to detect the tester's pulse beat signals. FIG. 6 shows conductance change signals of the upper and lower nanoparticle arrays measured by the external circuit. It can be seen from FIG. 6 that the tester's pulse rate during the measurement is about 88-89 beats per minute, which is consistent with the measurement result of a commercially available medical instrument. The test proves that the sensor in the present invention is wearable and can be put into industrial production and application.

What is claimed is:

1. A flexible temperature-sensitive pressure sensor based on nanoparticle array quantum conductance, wherein the sensor comprises a high polymer film (1), metal nanoparticle arrays (2), metal microelectrodes (3), and an external circuit for conductance measurement (4); at least one group of metal nanoparticle arrays (2) are deposited on upper and lower surfaces of the high polymer film (1), and in the same group, positions of metal nanoparticle arrays (2) on the upper and lower surfaces are in one-to-one correspondence; the metal microelectrodes (3) are arranged on two sides of each group of metal nanoparticle arrays (2) and are symmetrically distributed on the upper and lower surfaces of the high polymer film (1); the external circuit for conductance measurement (4) is electrically connected to the metal microelectrodes (3); and conductivity of the metal nanoparticle arrays (2) on the upper and lower surfaces changes with the same magnitude as a temperature change, and the conductivity of the metal nanoparticle arrays (2) on the upper and lower surfaces changes with an opposite tendency to a pressure change.

2. The flexible temperature-sensitive pressure sensor based on nanoparticle array quantum conductance according to claim 1, wherein the high polymer film (1) is an insulating film with a resistivity greater than or equal to $10^9$ $\Omega \cdot m$, an elastic modulus ranging from 100 kPa to 4000 MPa, and a thickness ranging from 0.05 mm to 1 mm, comprising: polydimethylsiloxane, silicone rubber, fluorine rubber, or polyethylene terephthalate.

3. A method for assembling the flexible temperature-sensitive pressure sensor based on nanoparticle array quantum conductance according to claim 2, comprising the following steps:
   step 1: selecting a high polymer film (1) with a smooth and clean surface without obvious scratches;
   step 2: printing metal microelectrodes (3) at corresponding positions on upper and lower surfaces of the high polymer film (1) by means of mask printing, electroplating, or evaporation;
   step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;

step 4: after depositing the metal nanoparticle arrays (2), using enameled wires to connect the metal microelectrodes (3) to an external circuit for conductance measurement (4);

step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

4. Application of the flexible temperature-sensitive pressure sensor based on nanoparticle array quantum conductance according to claim 2 in wearable device, artificial skin, or micro-robot detection.

5. The flexible temperature-sensitive pressure sensor based on nanoparticle array quantum conductance according to claim 1, wherein the metal nanoparticle arrays (2) are made of gold, silver, palladium, platinum, chromium, or aluminum; an average particle size ranges from 5 nm to 30 nm, an average distance between adjacent particles ranges from 0.1 nm to 5 nm, coverage of the metal nanoparticle arrays (2) ranges from 30% to 90%; and electrons are transmitted between particles in a tunneling or hopping manner, and resistance of each array is greater than or equal to 10 kΩ.

6. A method for assembling the flexible temperature-sensitive pressure sensor based on nanoparticle array quantum conductance according to claim 5, comprising the following steps:

step 1: selecting a high polymer film (1) with a smooth and clean surface without obvious scratches;

step 2: printing metal microelectrodes (3) at corresponding positions on upper and lower surfaces of the high polymer film (1) by means of mask printing, electroplating, or evaporation;

step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;

step 4: after depositing the metal nanoparticle arrays (2), using enameled wires to connect the metal microelectrodes (3) to an external circuit for conductance measurement (4);

step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

7. Application of the flexible temperature-sensitive pressure sensor based on nanoparticle array quantum conductance according to claim 5 in wearable device, artificial skin, or micro-robot detection.

8. The flexible temperature-sensitive pressure sensor based on nanoparticle array quantum conductance according to claim 1, wherein the metal microelectrodes (3) are interdigital electrodes, parallel electrodes, or spiral electrodes made of gold or silver, an electrode thickness ranges from 100 nm to 300 nm, and a distance between two electrodes ranges from 4 μm to 300 μm.

9. A method for assembling the flexible temperature-sensitive pressure sensor based on nanoparticle array quantum conductance according to claim 8, comprising the following steps:

step 1: selecting a high polymer film (1) with a smooth and clean surface without obvious scratches;

step 2: printing metal microelectrodes (3) at corresponding positions on upper and lower surfaces of the high polymer film (1) by means of mask printing, electroplating, or evaporation;

step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;

step 4: after depositing the metal nanoparticle arrays (2), using enameled wires to connect the metal microelectrodes (3) to an external circuit for conductance measurement (4);

step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

10. Application of the flexible temperature-sensitive pressure sensor based on nanoparticle array quantum conductance according to claim 8 in wearable device, artificial skin, or micro-robot detection.

11. The flexible temperature-sensitive pressure sensor based on nanoparticle array quantum conductance according to claim 1, wherein the external circuit for conductance measurement (4) has a collection frequency ranging from 1 Hz to 2000 Hz, and is connected to the metal microelectrodes (3) through enameled wires with a diameter ranging from 10 μm to 100 μm.

12. A method for assembling the flexible temperature-sensitive pressure sensor based on nanoparticle array quantum conductance according to claim 11, comprising the following steps:
step 1: selecting a high polymer film (1) with a smooth and clean surface without obvious scratches;
step 2: printing metal microelectrodes (3) at corresponding positions on upper and lower surfaces of the high polymer film (1) by means of mask printing, electroplating, or evaporation;
step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;
step 4: after depositing the metal nanoparticle arrays (2), using enameled wires to connect the metal microelectrodes (3) to an external circuit for conductance measurement (4);
step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and
step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

13. Application of the flexible temperature-sensitive pressure sensor based on nanoparticle array quantum conductance according to claim 11 in wearable device, artificial skin, or micro-robot detection.

14. The flexible temperature-sensitive pressure sensor based on nanoparticle array quantum conductance according to claim 1, wherein a measurement temperature range of the sensor is 20-70° C.

15. A method for assembling the flexible temperature-sensitive pressure sensor based on nanoparticle array quantum conductance according to claim 14, comprising the following steps:
step 1: selecting a high polymer film (1) with a smooth and clean surface without obvious scratches;
step 2: printing metal microelectrodes (3) at corresponding positions on upper and lower surfaces of the high polymer film (1) by means of mask printing, electroplating, or evaporation;
step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;
step 4: after depositing the metal nanoparticle arrays (2), using enameled wires to connect the metal microelectrodes (3) to an external circuit for conductance measurement (4);
step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and
step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

16. Application of the flexible temperature-sensitive pressure sensor based on nanoparticle array quantum conductance according to claim 14 in wearable device, artificial skin, or micro-robot detection.

17. The flexible temperature-sensitive pressure sensor based on nanoparticle array quantum conductance according to claim 1, wherein a measurement pressure range of the sensor is 0.5-100,000 Pa.

18. A method for assembling the flexible temperature-sensitive pressure sensor based on nanoparticle array quantum conductance according to claim 17, comprising the following steps:
step 1: selecting a high polymer film (1) with a smooth and clean surface without obvious scratches;
step 2: printing metal microelectrodes (3) at corresponding positions on upper and lower surfaces of the high polymer film (1) by means of mask printing, electroplating, or evaporation;
step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;

step 4: after depositing the metal nanoparticle arrays (2), using enameled wires to connect the metal microelectrodes (3) to an external circuit for conductance measurement (4);

step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

19. A method for assembling the flexible temperature-sensitive pressure sensor based on nanoparticle array quantum conductance according to claim 1, comprising the following steps:

step 1: selecting a high polymer film (1) with a smooth and clean surface without obvious scratches;

step 2: printing metal microelectrodes (3) at corresponding positions on upper and lower surfaces of the high polymer film (1) by means of mask printing, electroplating, or evaporation;

step 3: depositing metal nanoparticle arrays (2) with the same coverage between the metal microelectrodes (3) on the upper and lower surfaces of the high polymer film (1), wherein metal nanoparticles are generated by a magnetron plasma gas aggregation cluster source, and nanoparticle beams are formed based on a differential pressure and deposited between the metal microelectrodes (3); and during the deposition, both ends of the electrodes are connected to a monitoring circuit to monitor nanoparticle array conductance in real time;

step 4: after depositing the metal nanoparticle arrays (2), using enameled wires to connect the metal microelectrodes (3) to an external circuit for conductance measurement (4);

step 5: placing the high polymer film (1) on a heating platform, operating the heating platform to control the high polymer film (1) in a temperature-changing environment, measuring relative conductance change rates of the nanoparticle arrays on the upper and lower surfaces at different ambient temperatures, drawing a line graph, finding a temperature sensitivity coefficient of each array, and inputting the coefficient to the external circuit for conductance measurement (4) to implement temperature calibration of the sensor; and step 6: placing the high polymer film (1) in a pressurized environment, measuring relative conductance change rates of the nanoparticle arrays on the upper and lower surfaces of the sample when different pressures are applied on a sensor surface, drawing a line graph, finding a pressure sensitivity coefficient of each array, and inputting the coefficient to the external circuit for conductance measurement (4) to implement pressure calibration of the sensor.

20. Application of the flexible temperature-sensitive pressure sensor based on nanoparticle array quantum conductance according to claim 1 in wearable device, artificial skin, or micro-robot detection.

* * * * *